UNITED STATES PATENT OFFICE.

HENRY SELLMAN, OF HOBOKEN, NEW JERSEY, AND HERMAN REESSING AND JULIUS WOLFF, OF NEW YORK, N. Y.; SAID REESSING AND WOLFF ASSIGNORS TO SAID SELLMAN.

IMPROVEMENT IN COMPOUNDS FOR PRESERVING FISH.

Specification forming part of Letters Patent No. 166,308, dated August 3, 1875; Reissue No. 7,959, dated November 20, 1877; application filed January 12, 1876.

*To all whom it may concern:*

Be it known that we, HENRY SELLMAN, of Hoboken, in the county of Hudson and State of New Jersey, and HERMAN REESSING and JULIUS WOLFF, of the city, county, and State of New York, have invented a new and useful Improvement in the Method of Preparing Fish caught in American waters, of which the following is a specification:

The object of this invention is to furnish an improved mode of preserving fish caught in American waters, to take the place of the imported sardines, and which shall be a better article.

These fish are caught in nets, and are thrown, while still alive, into a strong brine contained in suitable casks on board of the fishing-vessels. They are kept in this brine for at least ten day, and are then taken out, beheaded, gutted, and scaled. They are then thoroughly cleansed in clear cold water, and placed in large willow baskets, or in sieves, to allow the water to drain and dry off. After draining for five or six hours they are emptied and spread upon the packing-tables, and are assorted as to their size, each size being packed separately. They are then preserved and flavored by being packed with a compound.

Our improvement consists in the use of a compound which shall contain certain preservative substances combined with flavoring substances.

We propose to use for the preservative substances vinegar with allspice and Chili pepper, or one of them, or their equivalents.

We propose to use as flavoring substances onions, bay-leaves, horse-radish, cloves, ginger, coriander-seeds, capers, or one or more of them, or their equivalents.

When all of these preservative and flavoring ingredients are used in the compound, we prefer to employ them in the following proportions, though these proportions may be varied somewhat without departing from the spirit of our invention: Two gallons of vinegar, one and a half pound of allspice, four pounds of sliced onions, two pounds of sliced horse-radish, one pound of bay-leaves, one-half pound of cloves, one-half pound of ginger, one-half pound of coriander-seed, one-quarter of a pound of Chili pepper, and two and a half ounces of capers.

In applying the compound we prefer to proceed as follows, namely: In packing the fish a small quantity of the vinegar and a thin layer of the other ingredients are placed at the bottom of the vessel, and a layer of fish placed backs upward is then put in and gently pressed down. Another small quantity of vinegar and thin layer of the other ingredients are next put in, and another layer of fish, and so on until the vessel is full.

The fish are ready for market and consumption in about four days in summer, and in from three to four weeks in winter.

We claim—

In a compound for preserving and flavoring fish, vinegar, allspice, and Chili pepper, with the flavoring substances substantially as described.

HENRY SELLMAN.
HERMAN REESSING.
JULIUS WOLFF.

Witnesses:
SAML. SUSSMAN,
JAMES H. HUNTER.